Patented Aug. 17, 1926.

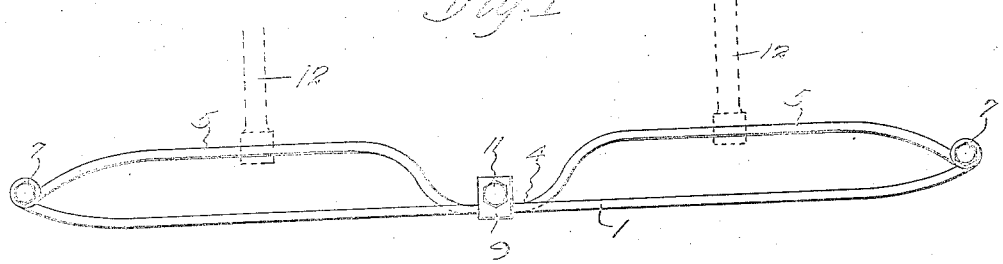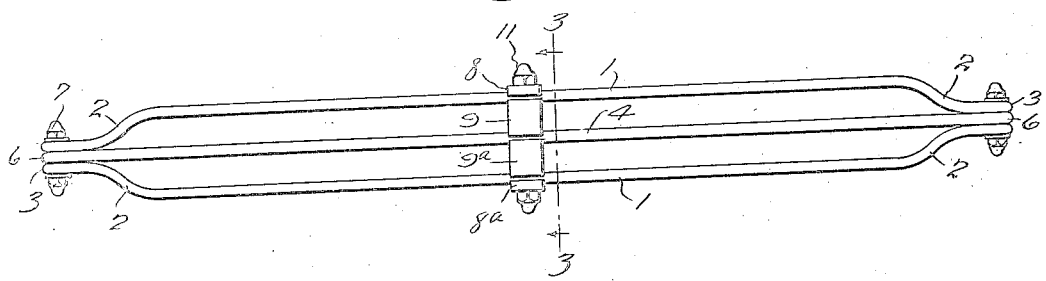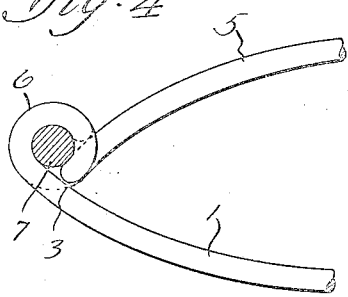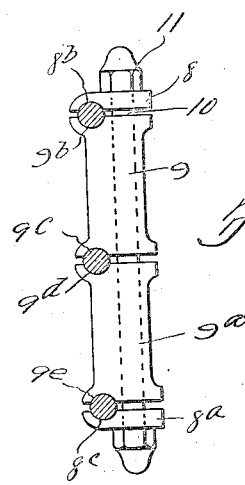

1,596,485

UNITED STATES PATENT OFFICE.

CHRISTIAN GIRL, OF KALAMAZOO, MICHIGAN, ASSIGNOR TO THE C. G. SPRING & BUMPER COMPANY, OF DETROIT, MICHIGAN, A CORPORATION OF DELAWARE.

AUTOMOBILE BUMPER.

Application filed January 16, 1922. Serial No. 529,652.

This invention relates to automobile bumpers, and has for its general object to produce a bumper for use with vehicles of this type which, while having a widened impact area consisting of a plurality of vertically spaced bars, shall be simple and economical of production, while amply capable of performing its functions. A further object of the invention is to provide a bumper of this character in which ordinary rods (preferably round) may be employed for the various parts or bars of the bumper. With the foregoing general objects in view, other and more limited objects of the invention will appear hereinafter and will be realized in and through the construction embodied in the drawings forming part hereof, wherein Fig. 1 represents a plan view of a bumper constructed in accordance with my invention; Fig. 2 a front elevation of such bumper; Fig. 3 a detail in section corresponding to the line 3—3 of Fig. 2; and Fig. 4 a detail in sectional plan view of the end connections between the bumper bars or rods.

Describing the various parts by reference characters, 1, 1 denote a pair of front or impact bars, the same being preferably of round rod construction. Each of these bars has its outer end deflected, as indicated at 2, and is provided at its extreme end portion with an eye 3.

Cooperating with the bars 1, 1 is a rear bar having a central portion 4 bent forwardly into vertical alignment with the central portions of the bars 1 and having end portions 5 spaced from the corresponding portions of the front bars, the extreme ends of the portions 5 being provided each with an eye 6. The front and rear members are of such length that the eyes 6 may be inserted between the corresponding eyes 3 and in register therewith, the ends of the rear member being secured to the ends of the front member by means of bolts 7 extending through such eyes. It will be noted also that the bars 1, 1 are so arranged that their intermediate portions project in opposite directions vertically from each other, thus providing a widened front, or impact, section extending substantially the entire length of the bumper.

For the purpose of securing the portion 4 of the rear bar to the corresponding central portions of the front bars, a clamp, such as shown in detail in Fig. 3, is employed. This clamp comprises an upper member 8 and a lower member 8$^a$, each having a rounded recessed seat 8$^b$, 8$^c$, therein, respectively, for engagement with the upper and lower surfaces of the upper and lower bars 1, respectively. In addition, the clamp comprises an upper and a lower intermediate sleeve member 9, 9$^a$, each provided at its opposite ends with a rounded recessed seat, indicated at 9$^b$ and 9$^c$ in the member 9 and at 9$^d$ and 9$^e$ in the member 9$^a$, the seats 9$^b$ and 9$^e$ cooperating respectively with the upper and lower surfaces of the upper and lower members 1 and the seats 9$^c$ and 9$^d$ cooperating with the upper and the lower surface of the rear bar 4, respectively. The clamping members are perforated for the reception of a bolt 10 having a nut 11 thereon for securing the various members together upon the bars 1, 1 and 4. The bumper will be connected to the vehicle side frames in any convenient manner, as by means of arms, indicated conventionally at 12 in Fig. 1.

By the construction illustrated and described herein, I have produced a bumper which may be made from ordinary round stock and which is not only cheap, but which is easily worked and shaped. Furthermore, by the manner of constructing and connecting the parts of this bumper, I have produced a bumper which is capable of withstanding all of the ordinary incidents of use and, in fact, of realizing in a most efficient manner the functions necessary for articles or devices of this nature.

Having thus described my invention, what I claim is:

1. A bumper comprising a pair of round bars extending substantially the full length of the front or impact portion of such bumper and each having its ends bent or deflected toward the corresponding ends of the other, a rear round bar having its ends interposed between the ends of the first mentioned bars and connected thereto, and means connecting the central portions of said bars.

2. A bumper comprising a front or impact section having an upper and a lower round bar, each having its ends bent or deflected toward the corresponding ends of the other and provided each with an eye, a rear bar of round stock having its central portion projected between and connected to the central portions of the first mentioned bars and having its ends provided with eyes adapted to be inserted between and secured to the eyes at the corresponing ends of the first mentioned bars.

3. A bumper comprising a front or impact section having an upper and a lower round bar each having its ends bent or deflected toward the corresponding ends of the other and provided each with an eye, a rear bar having its ends provided with eyes adapted to be inserted between and secured to the eyes at the corresponding ends of the first mentioned bars.

4. A bumper comprising a front or impact section having a pair of vertically spaced round bars and a rear round bar arranged intermediate of the first two bars and connected at its ends to the ends of said bars, the rear bar having its intermediate portion projected between the intermediate portions of the first two bars, and means for clamping together the intermediate portions of such bars, the said means comprising an upper clamping member having a rounded seat in the lower surface thereof for the upper surface of the uppermost bar, a lower clamping member having a rounded seat in the upper surface thereof for the lower surface of the lowermost bar, and a pair of intermediate clamping members interposed between the intermediate bar and the uppermost and lowermost bars, respectively, each intermediate clamping member having at one end a rounded seat for the adjacent surface of the corresponding uppermost or lowermost bar and at its other end a rounded seat for the adjacent surface of the intermediate bar, and means for securing the said clamping members together and in engagement with the aforesaid bars.

5. A bumper comprising vertically spaced upper and lower front bars each of round stock and each having its ends bent or deflected toward the corresponding ends of the other, a rear bar of round stock having its ends interposed between the corresponding ends of the first mentioned bars and a central portion projected toward and between the central portions of the first mentioned bars, the ends of said bars being provided with registering eyes, bolts extending through said eyes, and a common clamping device connecting the intermediate portions of all of said bars.

6. A bumper comprising vertically spaced upper and lower front bars each of round stock and each having its ends bent or deflected toward the corresponding ends of the other, and a rear bar of round stock having its ends interposed between the corresponding ends of the first mentioned bars and a central portion projected toward and between the central portions of the first mentioned bars, means connecting the ends of said bars, and a common clamping device connecting the intermediate portions of all of said bars.

7. A bumper comprising a resilient impact member consisting of a plurality of separate bars of substantially uniform transverse dimension, extending throughout the length thereof and secured together one above the other throughout a portion of its length, and spaced apart to form a portion of increased width.

8. A bumper comprising a composite bar consisting of a plurality of smaller bars extending one above the other throughout the length thereof and spaced apart vertically throughout one portion of its length to provide an area of increased width.

In testimony whereof, I hereunto affix my signature.

CHRISTIAN GIRL.